US010120378B2

(12) United States Patent
Matsushita et al.

(10) Patent No.: US 10,120,378 B2
(45) Date of Patent: Nov. 6, 2018

(54) VEHICLE AUTOMATED DRIVING SYSTEM

(71) Applicant: TOYOTA JIDOSHA KABUSHIKI KAISHA, Toyota-shi, Aichi-ken (JP)

(72) Inventors: Naoki Matsushita, Yamato (JP); Yuichi Kumai, Gotenba (JP); Masaki Matsunaga, Odawara (JP); Masahiro Iwasaki, Numazu (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/471,218

(22) Filed: Mar. 28, 2017

(65) Prior Publication Data

US 2017/0293299 A1    Oct. 12, 2017

(30) Foreign Application Priority Data

Apr. 7, 2016  (JP) .................................. 2016-077389

(51) Int. Cl.
*B60R 22/00*    (2006.01)
*G05D 1/00*    (2006.01)
(Continued)

(52) U.S. Cl.
CPC ............ *G05D 1/0061* (2013.01); *B60R 11/04* (2013.01); *B60W 10/04* (2013.01); *B60W 10/18* (2013.01); *B60W 10/20* (2013.01); *B60W 10/30* (2013.01); *B60W 30/16* (2013.01); *B60W 30/18163* (2013.01); *B60W 40/02* (2013.01);
(Continued)

(58) Field of Classification Search
CPC ....... G05D 1/0061; B60R 11/04; B60W 10/04
See application file for complete search history.

(56) References Cited

U.S. PATENT DOCUMENTS 8,155,879 B2 *  4/2012  Takagi ................ B60T 8/17558
                                                  180/271
8,344,864 B1 *  1/2013  Al-Mutawa ........... B60W 50/12
                                                  340/435
(Continued)

FOREIGN PATENT DOCUMENTS

JP        06-107031 A    4/1994
JP         9-86223 A    3/1997
(Continued)

*Primary Examiner* — Adam Mohamed Alharbi
(74) *Attorney, Agent, or Firm* — Sughrue Mion, PLLC

(57) ABSTRACT

An automated driving system 100 of a vehicle comprising: a surrounding environment information acquiring device 10; a vehicle information acquiring device 20; a driver information acquiring device 30; an automated driving executing part 90; a package determining part 91, a package proposing part 92; and an emergency condition judging part 93. The automated driving executing part performs automated driving of the vehicle based on an emergency driving assistance package packaging permissions of the plurality of driving assistance operations when the driver is in an emergency condition, if the emergency condition judging part judges that the driver is in an emergency condition, and performs automated driving of the vehicle based on the driving assistance package proposed by the packaging proposing part and approved by the driver, if the emergency condition judging part judges that the driver is not in an emergency condition.

20 Claims, 14 Drawing Sheets

(51) Int. Cl.
| | |
|---|---|
| *B60R 11/04* | (2006.01) |
| *B60W 10/04* | (2006.01) |
| *B60W 10/18* | (2012.01) |
| *B60W 10/20* | (2006.01) |
| *B60W 10/30* | (2006.01) |
| *B60W 30/16* | (2012.01) |
| *B60W 30/18* | (2012.01) |
| *B60W 40/02* | (2006.01) |
| *B60W 40/08* | (2012.01) |
| *B60W 50/08* | (2012.01) |
| *G01S 19/13* | (2010.01) |

(52) U.S. Cl.
CPC .......... *B60W 40/08* (2013.01); *B60W 50/082* (2013.01); *G05D 1/0088* (2013.01); *B60W 2040/0872* (2013.01); *B60W 2420/52* (2013.01); *B60W 2520/105* (2013.01); *B60W 2520/14* (2013.01); *B60W 2550/14* (2013.01); *B60W 2710/30* (2013.01); *G01S 19/13* (2013.01); *G05D 2201/0213* (2013.01)

(56) References Cited

U.S. PATENT DOCUMENTS

| | | | |
|---|---|---|---|
| 8,379,924 B2 * | 2/2013 | Schaufler | G06K 9/00791 |
| | | | 348/113 |
| 8,670,891 B1 | 3/2014 | Szybalski et al. | |
| 2016/0009296 A1 | 1/2016 | Iguchi et al. | |

FOREIGN PATENT DOCUMENTS

| | | |
|---|---|---|
| JP | 11-102157 A | 4/1999 |
| JP | 2007-196854 A | 8/2007 |
| JP | 2016-016765 A | 2/2016 |

* cited by examiner

FIG. 4

| | DRIVING ASSISTANCE OPERATIONS |
|---|---|
| RUNNING ASSIST FUNCTIONS | VEHICLE DISTANCE CONTROL |
| | LANE TRACKING CONTROL |
| | AUTO STOPPING CONTROL |
| | AUTO LANE CHANGE |
| | AUTO PASSING |
| | AUTO BRANCHING |
| | AUTO MERGING |
| VISION ASSIST FUNCTIONS | LANE DEPARTURE WARNING |
| | BLIND SPOT MONITORING |
| | VEHICLE PROXIMITY ALARM |
| | PEDESTRIAN PROXIMITY ALARM |
| | HI BEAM AUTO CHANGE |
| | HEADLIGHT AUTO DIRECTION CONTROL |
| | HEADLIGHT/FOGLIGHT AUTO TURN ON |
| | WIPER AUTO OPERATION |
| | DEFROSTER AUTO OPERATION |
| | NIGHT VIEW AUTO OPERATION |
| | PROVISION OF SURROUNDING SITUATION |
| CONGESTION ASSIST FUNCTIONS | AUTO START FROM STOP AT CONGESTION |
| | HAZARD LIGHT TEMPORARY TURN ON CONTROL |
| | AUTO SWITCH OF CIRCULATION OF INSIDE/OUTSIDE AIR OF AC |
| | CHANGE OF SEAT POSITION |
| | PROVISION OF CONGESTION INFORMATION |
| | DISPLAY OF MOVING IMAGE |
| | AUTO ADJUSTMENT OF AUDIO VOLUME |
| | JERK REDUCING RUNNING CONTROL |

FIG. 5

| | DRIVING ASSISTANCE OPERATIONS | CLEAR | RAIN | HEAVY RAIN | SNOW | HEAVY SNOW | FOG | DENSE FOG | WINDY | STRONG WIND |
|---|---|---|---|---|---|---|---|---|---|---|
| RUNNING ASSIST FUNCTIONS | VEHICLE DISTANCE CONTROL | O | O | O | O | O | O | O | O | O |
| | LANE TRACKING CONTROL | O | O | x | O | x | O | x | O | O |
| | AUTO STOPPING CONTROL | x | x | x | x | x | x | x | x | x |
| | AUTO LANE CHANGE | O | x | x | x | x | x | x | x | x |
| | AUTO PASSING | O | x | x | x | x | x | x | x | x |
| | AUTO BRANCHING | O | x | x | x | x | x | x | x | x |
| | AUTO MERGING | O | x | x | x | x | x | x | x | x |
| VISION ASSIST FUNCTIONS | LANE DEPARTURE WARNING | x | O | x | O | x | O | x | O | O |
| | BLIND SPOT MONITORING | x | x | x | O | x | O | x | O | O |
| | VEHICLE PROXIMITY ALARM | x | O | x | O | x | O | x | O | O |
| | PEDESTRIAN PROXIMITY ALARM | x | x | x | x | x | x | x | x | x |
| | HI BEAM AUTO CHANGE | x | x | O | x | x | x | x | x | x |
| | HEADLIGHT AUTO DIRECTION CONTROL | x | O | O | x | x | x | x | x | x |
| | HEADLIGHT/FOGLIGHT AUTO TURN ON | x | O | O | O | x | O | O | x | x |
| | WIPER AUTO OPERATION | x | O | O | x | x | x | x | x | x |
| | DEFROSTER AUTO OPERATION | x | x | x | O | O | x | x | x | x |
| | NIGHT VIEW AUTO OPERATION | x | x | x | x | x | x | x | x | x |
| | PROVISION OF SURROUNDING SITUATION | x | x | x | x | x | x | x | x | x |
| CONGESTION ASSIST FUNCTIONS | AUTO START FROM STOP AT CONGESTION | x | x | x | x | x | x | x | x | x |
| | HAZARD LIGHT TEMPORARY TURN ON CONTROL | x | x | x | x | x | x | x | x | x |
| | AUTO SWITCH OF CIRCULATION OF INSIDE/OUTSIDE AIR OF AC | x | x | x | x | x | x | x | x | x |
| | CHANGE OF SEAT POSITION | x | x | x | x | x | x | x | x | x |
| | PROVISION OF CONGESTION INFORMATION | x | x | x | x | x | x | x | x | x |
| | DISPLAY OF MOVING IMAGE | x | x | x | x | x | x | x | x | x |
| | AUTO ADJUSTMENT OF AUDIO VOLUME | x | x | x | x | x | x | x | x | x |
| | JERK REDUCING RUNNING CONTROL | x | x | x | x | x | x | x | x | x |

FIG. 6

| | DRIVING ASSISTANCE OPERATIONS | DAY | NIGHT |
|---|---|---|---|
| RUNNING ASSIST FUNCTIONS | VEHICLE DISTANCE CONTROL | ○ | ○ |
| | LANE TRACKING CONTROL | ○ | ○ |
| | AUTO STOPPING CONTROL | × | × |
| | AUTO LANE CHANGE | ○ | ○ |
| | AUTO PASSING | ○ | ○ |
| | AUTO BRANCHING | ○ | ○ |
| | AUTO MERGING | ○ | ○ |
| VISION ASSIST FUNCTIONS | LANE DEPARTURE WARNING | × | × |
| | BLIND SPOT MONITORING | × | × |
| | VEHICLE PROXIMITY ALARM | × | × |
| | PEDESTRIAN PROXIMITY ALARM | × | × |
| | HI BEAM AUTO CHANGE | × | ○ |
| | HEADLIGHT AUTO DIRECTION CONTROL | × | ○ |
| | HEADLIGHT/FOGLIGHT AUTO TURN ON | × | × |
| | WIPER AUTO OPERATION | × | × |
| | DEFROSTER AUTO OPERATION | × | × |
| | NIGHT VIEW AUTO OPERATION | × | ○ |
| | PROVISION OF SURROUNDING SITUATION | × | × |
| CONGESTION ASSIST FUNCTIONS | AUTO START FROM STOP AT CONGESTION | × | × |
| | HAZARD LIGHT TEMPORARY TURN ON CONTROL | × | × |
| | AUTO SWITCH OF CIRCULATION OF INSIDE/OUTSIDE AIR OF AC | × | × |
| | CHANGE OF SEAT POSITION | × | × |
| | PROVISION OF CONGESTION INFORMATION | × | × |
| | DISPLAY OF MOVING IMAGE | × | × |
| | AUTO ADJUSTMENT OF AUDIO VOLUME | × | × |
| | JERK REDUCING RUNNING CONTROL | × | × |

FIG. 7

| | DRIVING ASSISTANCE OPERATIONS | GENERAL ROADS | TRUNK ROADS | INTER-CITY HIGHWAYS | CITY HIGHWAYS |
|---|---|---|---|---|---|
| RUNNING ASSIST FUNCTIONS | VEHICLE DISTANCE CONTROL | ○ | ○ | ○ | ○ |
| | LANE TRACKING CONTROL | ○ | ○ | × | ○ |
| | AUTO STOPPING CONTROL | × | × | × | × |
| | AUTO LANE CHANGE | ○ | × | × | × |
| | AUTO PASSING | ○ | × | × | × |
| | AUTO BRANCHING | ○ | × | × | × |
| | AUTO MERGING | × | × | × | × |
| VISION ASSIST FUNCTIONS | LANE DEPARTURE WARNING | ○ | ○ | × | ○ |
| | BLIND SPOT MONITORING | ○ | ○ | × | ○ |
| | VEHICLE PROXIMITY ALARM | ○ | ○ | × | ○ |
| | PEDESTRIAN PROXIMITY ALARM | ○ | × | × | × |
| | HI BEAM AUTO CHANGE | ○ | × | × | × |
| | HEADLIGHT AUTO DIRECTION CONTROL | × | × | × | × |
| | HEADLIGHT/FOGLIGHT AUTO TURN ON | × | × | ○ | × |
| | WIPER AUTO OPERATION | × | × | ○ | ○ |
| | DEFROSTER AUTO OPERATION | × | ○ | ○ | ○ |
| | NIGHT VIEW AUTO OPERATION | × | × | × | × |
| | PROVISION OF SURROUNDING SITUATION | × | × | × | × |
| CONGESTION ASSIST FUNCTIONS | AUTO START FROM STOP AT CONGESTION | × | × | × | × |
| | HAZARD LIGHT TEMPORARY TURN ON CONTROL | × | × | × | × |
| | AUTO SWITCH OF CIRCULATION OF INSIDE/OUTSIDE AIR OF AC | × | × | × | × |
| | CHANGE OF SEAT POSITION | × | × | × | × |
| | PROVISION OF CONGESTION INFORMATION | × | × | × | × |
| | DISPLAY OF MOVING IMAGE | × | × | × | × |
| | AUTO ADJUSTMENT OF AUDIO VOLUME | × | × | × | × |
| | JERK REDUCING RUNNING CONTROL | × | × | × | × |

FIG. 8

| | DRIVING ASSISTANCE OPERATIONS | CONGESTED | NOT CONGESTED |
|---|---|---|---|
| RUNNING ASSIST FUNCTIONS | VEHICLE DISTANCE CONTROL | ○ | ○ |
| | LANE TRACKING CONTROL | ○ | ○ |
| | AUTO STOPPING CONTROL | × | × |
| | AUTO LANE CHANGE | × | ○ |
| | AUTO PASSING | × | ○ |
| | AUTO BRANCHING | ○ | ○ |
| | AUTO MERGING | ○ | ○ |
| VISION ASSIST FUNCTIONS | LANE DEPARTURE WARNING | ○ | × |
| | BLIND SPOT MONITORING | ○ | × |
| | VEHICLE PROXIMITY ALARM | ○ | × |
| | PEDESTRIAN PROXIMITY ALARM | ○ | × |
| | HI BEAM AUTO CHANGE | ○ | × |
| | HEADLIGHT AUTO DIRECTION CONTROL | ○ | × |
| | HEADLIGHT/FOGLIGHT AUTO TURN ON | ○ | × |
| | WIPER AUTO OPERATION | ○ | × |
| | DEFROSTER AUTO OPERATION | ○ | × |
| | NIGHT VIEW AUTO OPERATION | ○ | × |
| | PROVISION OF SURROUNDING SITUATION | ○ | × |
| CONGESTION ASSIST FUNCTIONS | AUTO START FROM STOP AT CONGESTION | ○ | × |
| | HAZARD LIGHT TEMPORARY TURN ON CONTROL | ○ | × |
| | AUTO SWITCH OF CIRCULATION OF INSIDE/OUTSIDE AIR OF AC | ○ | × |
| | CHANGE OF SEAT POSITION | ○ | × |
| | PROVISION OF CONGESTION INFORMATION | ○ | × |
| | DISPLAY OF MOVING IMAGE | ○ | × |
| | AUTO ADJUSTMENT OF AUDIO VOLUME | ○ | × |
| | JERK REDUCING RUNNING CONTROL | ○ | × |

FIG. 9

| | Driving Assistance Operations | SLEEPY | TIRED | OVERWORKED | | NORMAL | DISTRACTED | DEADMAN |
|---|---|---|---|---|---|---|---|---|
| RUNNING ASSIST FUNCTIONS | VEHICLE DISTANCE CONTROL | O | O | O | O | O | O | × |
| | LANE TRACKING CONTROL | O | O | O | O | O | O | O |
| | AUTO STOPPING CONTROL | × | × | × | × | × | × | O |
| | AUTO LANE CHANGE | × | O | × | × | O | O | × |
| | AUTO PASSING | × | O | × | × | × | × | × |
| | AUTO BRANCHING | O | × | O | × | O | × | × |
| | AUTO MERGING | O | × | × | × | O | × | × |
| VISION ASSIST FUNCTIONS | LANE DEPARTURE WARNING | × | × | × | × | × | × | O |
| | BLIND SPOT MONITORING | × | × | × | × | × | × | O |
| | VEHICLE PROXIMITY ALARM | × | × | × | × | × | × | O |
| | PEDESTRIAN PROXIMITY ALARM | × | × | × | × | × | × | O |
| | HI BEAM AUTO CHANGE | × | × | × | × | × | × | O |
| | HEADLIGHT AUTO DIRECTION CONTROL | × | × | × | × | × | × | O |
| | HEADLIGHT/FOGLIGHT AUTO TURN ON | × | × | × | × | × | × | O |
| | WIPER AUTO OPERATION | × | × | × | × | × | × | O |
| | DEFROSTER AUTO OPERATION | × | × | × | × | × | × | O |
| | NIGHT VIEW AUTO OPERATION | × | × | × | × | × | × | O |
| | PROVISION OF SURROUNDING SITUATION | × | × | × | × | × | × | O |
| CONGESTION ASSIST FUNCTIONS | AUTO START FROM STOP AT CONGESTION | × | × | × | × | × | × | O |
| | HAZARD LIGHT TEMPORARY TURN ON CONTROL | × | × | × | × | × | × | × |
| | AUTO SWITCH OF CIRCULATION OF INSIDE/OUTSIDE AIR OF AC | × | × | × | × | × | × | × |
| | CHANGE OF SEAT POSITION | × | × | × | × | × | × | × |
| | PROVISION OF CONGESTION INFORMATION | × | × | × | × | × | × | × |
| | DISPLAY OF MOVING IMAGE | × | × | × | × | × | × | × |
| | AUTO ADJUSTMENT OF AUDIO VOLUME | × | × | × | × | × | × | × |
| | JERK REDUCING RUNNING CONTROL | × | × | × | × | × | × | × |

FIG. 10

| | DRIVING ASSISTANCE OPERATIONS | UNSTABLE | STABLE |
|---|---|---|---|
| RUNNING ASSIST FUNCTIONS | VEHICLE DISTANCE CONTROL | ○ | ○ |
| | LANE TRACKING CONTROL | ○ | ○ |
| | AUTO STOPPING CONTROL | × | × |
| | AUTO LANE CHANGE | × | ○ |
| | AUTO PASSING | × | ○ |
| | AUTO BRANCHING | × | ○ |
| | AUTO MERGING | × | ○ |
| VISION ASSIST FUNCTIONS | LANE DEPARTURE WARNING | × | × |
| | BLIND SPOT MONITORING | × | × |
| | VEHICLE PROXIMITY ALARM | × | × |
| | PEDESTRIAN PROXIMITY ALARM | × | × |
| | HI BEAM AUTO CHANGE | × | × |
| | HEADLIGHT AUTO DIRECTION CONTROL | × | × |
| | HEADLIGHT/FOGLIGHT AUTO TURN ON | × | × |
| | WIPER AUTO OPERATION | × | × |
| | DEFROSTER AUTO OPERATION | × | × |
| | NIGHT VIEW AUTO OPERATION | × | × |
| | PROVISION OF SURROUNDING SITUATION | × | × |
| CONGESTION ASSIST FUNCTIONS | AUTO START FROM STOP AT CONGESTION | × | × |
| | HAZARD LIGHT TEMPORARY TURN ON CONTROL | × | × |
| | AUTO SWITCH OF CIRCULATION OF INSIDE/OUTSIDE AIR OF AC | × | × |
| | CHANGE OF SEAT POSITION | × | × |
| | PROVISION OF CONGESTION INFORMATION | × | × |
| | DISPLAY OF MOVING IMAGE | × | × |
| | AUTO ADJUSTMENT OF AUDIO VOLUME | × | × |
| | JERK REDUCING RUNNING CONTROL | × | × |

VEHICLE AUTOMATED DRIVING SYSTEM

TECHNICAL FIELD

The present invention relates to a vehicle automated driving system.

BACKGROUND ART

PLT 1 discloses a conventional vehicle automated driving system wherein when a driver operates a switch to change from a manual driving mode to an automated driving mode, automated driving is performed including vehicle distance control, lane tracking control, and other various driving assistance operations performed automatically.

CITATIONS LIST

Patent Literature

PLT 1: U.S. Pat. No. 8,670,891
PLT 2: Japanese Patent Publication No. 11-102157A
PLT 3: Japanese Patent Publication No. 09-086223A

SUMMARY OF INVENTION

Technical Problem

However, the above-mentioned conventional vehicle control system used the fact of the automated driving mode being switched to so as to judge that the driver had given permission for all driving assistance operations. For this reason, when performing automated driving, the driver was only able to switch from the manual driving mode to the automated driving mode and could not freely set permissions for the individual driving assistance operations. However, to keep driving assistance operations not required by the driver from being performed, it is preferable to enable the driver to freely set permissions for individual driving assistance operations at the time of automated driving.

On the other hand, if a driver could freely set permissions for individual driving assistance operations at the time of automated driving, the operation by the driver for setting the system would become troublesome. Further, in poor weather and other predetermined surrounding environment conditions, some driving assistance operations could be difficult. Furthermore, in emergency conditions where the driver cannot operate the steering wheel etc., the driver cannot set permissions for individual driving assistance operations.

Therefore, an object of the present invention is to provide an automated driving system enabling a driver to easily set permissions for individual driving assistance operations in automated driving in accordance with the surrounding environment conditions etc. while securing safety at the time of emergencies.

Solution to Problem

In order to solve the above problem, in a first invention, there is provided an automated driving system of a vehicle comprising: a surrounding environment information acquiring device acquiring surrounding environment information relating to surrounding environment conditions of the vehicle; a vehicle information acquiring device acquiring vehicle information relating to conditions of the vehicle; a driver information acquiring device acquiring driver information relating to conditions of a driver of the vehicle; an automated driving executing part executing automated driving of the vehicle based on a driving assistance package packaging permissions for a plurality of driving assistance operations; a package determining part determining a driving assistance package to be proposed to the driver based on at least one of the surrounding environment information, the vehicle information, and the driver information, a package proposing part proposing the driving assistance package determined by the package determining part to the driver; and an emergency condition judging part judging if the driver is in an emergency condition based on the driver information, wherein the automated driving executing part performs automated driving of the vehicle based on an emergency driving assistance package packaging permissions of the plurality of driving assistance operations when the driver is in an emergency condition, if the emergency condition judging part judges that the driver is in an emergency condition, and performs automated driving of the vehicle based on the driving assistance package proposed by the packaging proposing part and approved by the driver, if the emergency condition judging part judges that the driver is not in an emergency condition.

In a second invention, the package determining part determines a driving assistance package to be proposed to the driver based on the driver information, and the emergency condition judging part judges that the driver is in an emergency condition when the driving assistance package determined by the package determining part is the emergency driving assistance package, in the first invention.

In a third invention, the system further comprises an alarm part issuing a warning to the driver, and the automated driving executing part performs automated driving of the vehicle based on the emergency driving assistance package if the emergency condition judging part judges that the driver is in an emergency condition after the warning by the alarm part, in the first or second invention.

In a forth invention, the alarm part issues the warning to the driver by sound, in the third invention.

In a fifth invention, the alarm part issues the warning to the driver by changing the behavior of the vehicle, in the third or fourth invention.

In a sixth invention, in the emergency driving assistance package, an auto stop control of the vehicle and a hazard light turn on control of the vehicle are permitted, in any one of the first to fifth inventions.

Advantageous Effects of Invention

According to the present invention, there is provided an automated driving system enabling a driver to easily set permissions for individual driving assistance operations in automated driving in accordance with the surrounding environment conditions etc. while securing safety at the time of emergencies.

BRIEF DESCRIPTION OF DRAWINGS

FIG. 4 is a view showing a list of driving assistance operations performed during an automated driving mode by an automated driving system.

FIG. 5 is a view showing a group of packages relating to weather conditions.

FIG. 6 is a view showing a group of packages relating to sunlight conditions.

FIG. 7 is a view showing a group of packages relating to road types.

FIG. 8 is a view showing a group of packages relating to road conditions.

FIG. 9 is a view showing a group of packages relating to driver conditions.

FIG. 10 is a view showing a group of packages relating to host vehicle conditions.

DESCRIPTION OF EMBODIMENT

Figure 1:
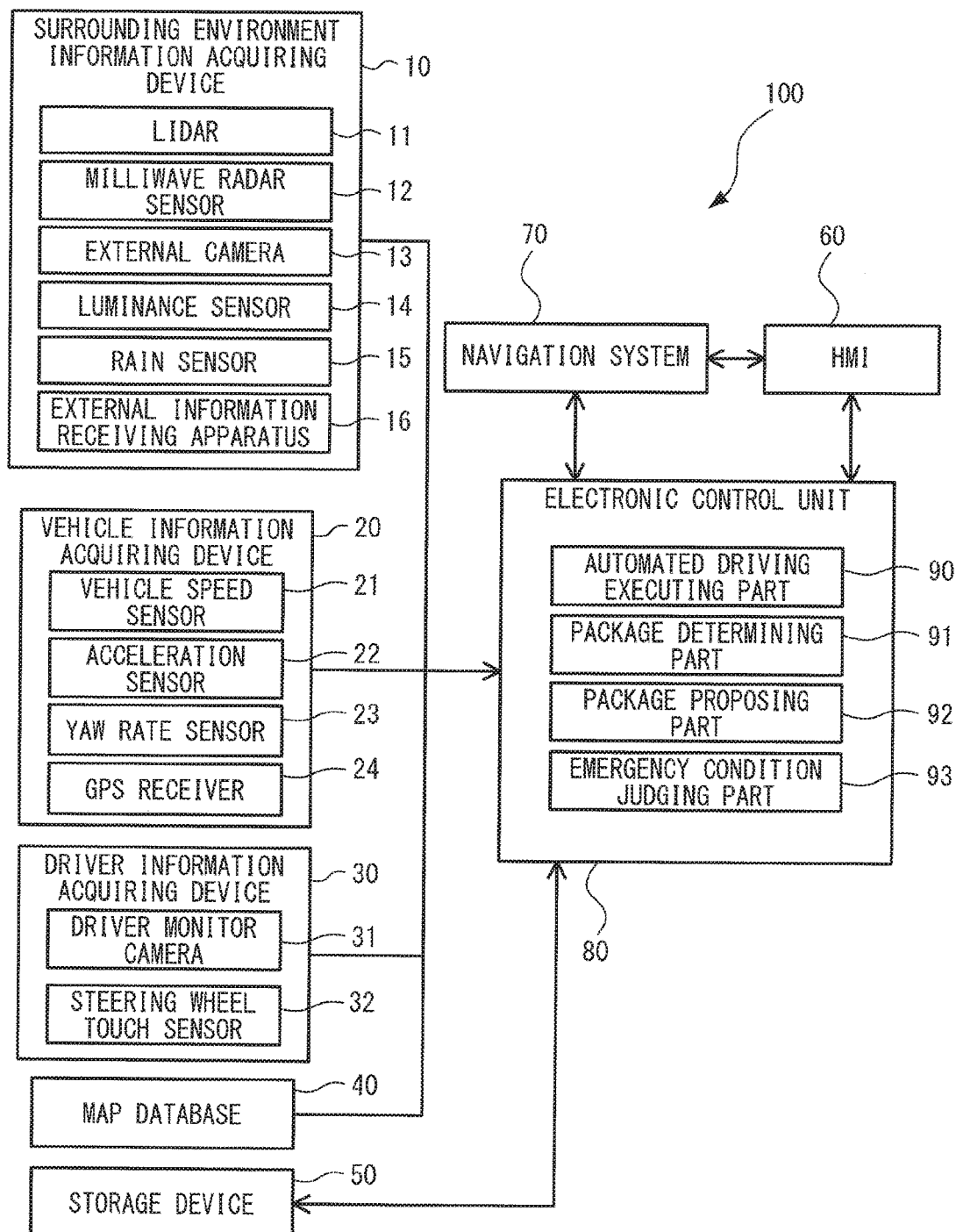
FIG. 1 is a block diagram showing the configuration of a vehicle automated driving system according to a first embodiment of the present invention.

Below, referring to the drawings, embodiments of the present invention will be explained in detail. Note that, in the following explanation, similar components are assigned the same reference notations.

First Embodiment

First, referring to FIG. 1 to FIG. 11, a first embodiment of the present invention will be explained.

<Configuration of Automated Driving System>

Figure 2:
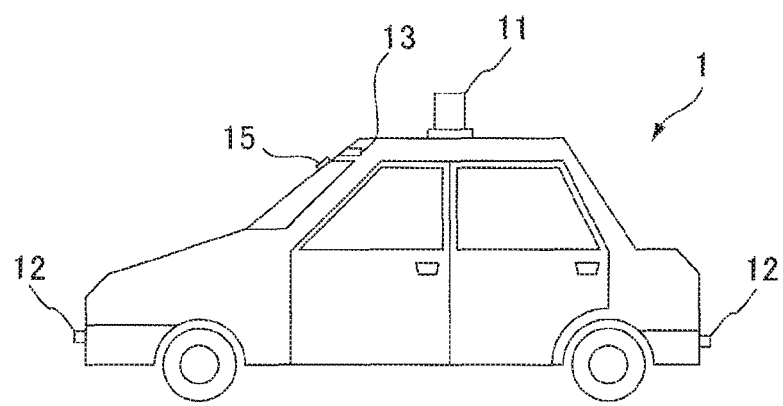
FIG. 2 is a schematic side view of a vehicle equipped with an automated driving system.
Figure 3:
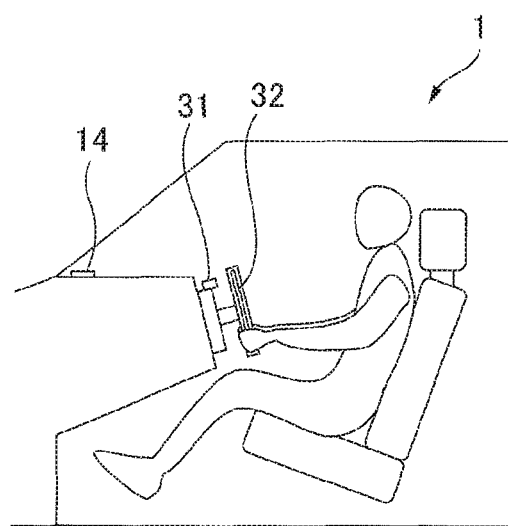
FIG. 3 is a view schematically showing the inside of a vehicle equipped with an automated driving system.

FIG. 1 is a block diagram showing the configuration of a vehicle automated driving system 100 according to the first embodiment of the present invention. FIG. 2 is a schematic side view of a vehicle 1 equipped with an automated driving system 100. FIG. 3 is a view schematically showing the inside of a vehicle 1 equipped with an automated driving system 100.

As shown in FIG. 1, the automated driving system 100 is provided with a surrounding environment information acquiring device 10, vehicle information acquiring device 20, driver information acquiring device 30, map database 40, storage device 50, human machine interface (HMI) 60, navigation system 70, and electronic control unit (ECU) 80.

The surrounding environment information acquiring device 10 acquires surrounding environment information relating to the conditions of the surrounding environment of the vehicle 1. The surrounding environment information includes the weather, the road on which the vehicle 1 is running, obstacles around the vehicle 1 (curbs, buildings, other vehicles, pedestrians, fallen objects, etc.) and other information. The surrounding environment information acquiring device 10 is provided with a LIDAR (laser imaging detection and ranging device) 11, milliwave radar sensors 12, an outside camera 13, a luminance sensor 14, a rain sensor 15, and an external information receiving apparatus 16.

The LIDAR 11 uses laser light to detect the road and obstacles in the surroundings of the vehicle 1. As shown in FIG. 2, in the present embodiment, the LIDAR 11 is attached to the roof of the vehicle 1. The LIDAR 11 successively irradiates laser light toward the entire surroundings of the vehicle 1 and measures the distances to the road and obstacles from the reflected light. The LIDAR 11 generates 3D images of the road and obstacles in the entire surroundings of the vehicle 1 based on the measurement results, and transmits the generated 3D image information as surrounding environment information to the electronic control unit 80. Note that, the position where the LIDAR 11 is mounted to the vehicle 1 may be a position different from the position shown in FIG. 2.

The milliwave radar sensors 12 use electrical waves to detect obstacles around the vehicle 1 over a further distance than the LIDAR 11. As shown in FIG. 2, in the present embodiment, the milliwave radar sensors 12 are attached to the front bumper and rear bumper of the vehicle 1. The milliwave radar sensors 12 emit electrical waves to the surroundings of the vehicle 1 (in the present embodiment, to the front, rear, and sides of the vehicle 1) and measure the distances to obstacles in the surroundings of the vehicle 1 and relative speeds with the obstacles from the reflected waves. The milliwave radar sensors 12 transmit the results of measurement as surrounding environment information to the electronic control unit 80.

Note that, the positions where the milliwave radar sensors 12 are attached to the vehicle 1 are not limited to the positions shown in FIG. 2 so long as positions enabling the necessary surrounding environment information to be acquired. For example, the milliwave radar sensors 12 may also be attached to the grilles of the vehicle 1 or the insides of the vehicle lights (for example headlights or brake lights) or the chassis part (frame) of the vehicle 1.

The outside camera 13 captures an image of the field in front of the vehicle 1. As shown in FIG. 2, in the present embodiment, the outside camera 13 is attached to the center of the front end of the roof of the vehicle 1. The outside camera 13 performs image processing of the captured image to detect information on obstacles in front of the vehicle 1, traffic information in the surroundings of the vehicle 1 (lane width, road shape, road signs, white lines, statuses of traffic lights, etc.), the yaw angle (relative direction of vehicle 1 to running lane), running information of vehicle 1 (for example, offset of vehicle 1 from center of running lane), meteorological information in the surroundings of vehicle 1 (information on rain, snow, fog, etc.), etc. The outside camera 13 transmits the detected information as surrounding environment information to the electronic control unit 80.

Note that, the position where the outside camera 13 is mounted at the vehicle 1 is not limited to the position shown in FIG. 2 so long as a position able to capture an image of the field in front of the vehicle 1. For example, the outside camera 13 may be attached to the top center of the back surface of the windshield at the inside of the vehicle 1.

The luminance sensor 14 detects the luminance of the surroundings of the vehicle 1. As shown in FIG. 2, in the present embodiment, the luminance sensor 14 is attached to the top surface of an instrument panel in the vehicle 1. The luminance sensor 14 transmits the detected luminance information of the surroundings of the vehicle 1 as surrounding environment information to the electronic control unit 80. Note that, the position where the luminance sensor 14 is mounted at the vehicle 1 may be a position different from the position shown in FIG. 3.

The rain sensor 15 detects the presence of rainfall and the amount of rainfall. As shown in FIG. 2, in the present embodiment, the rain sensor 15 is attached to the top center of the front surface of the windshield of the vehicle 1. The rain sensor 15 emits light generated from a built-in light emitting diode toward the front surface of the windshield and measures the change of the reflected light at that time so as to detect rainfall information such as the presence of rainfall and the amount of rainfall. The rain sensor 15 transmits the detected rainfall information as surrounding environment information to the electronic control unit 80. Note that, the position where the rain sensor 15 is attached to the vehicle 1 may be a position different from the position shown in FIG. 2.

The external information receiving apparatus 16 receives, for example, congestion information and meteorological information (weather, air temperature, wind speed, and other information) and other such external information sent from a road traffic information communication system center or other external communication center. The external information receiving apparatus 16 transmits the received external information as surrounding environment information to the electronic control unit 80.

The vehicle information acquiring device 20 acquires vehicle information relating to the conditions of the vehicle 1 (host vehicle). The vehicle information includes the speed, acceleration, posture, current position, and other information of the vehicle 1. As shown in FIG. 1, the vehicle information acquiring device 20 is provided with a speed sensor 21, an acceleration sensor 22, a yaw rate sensor 23, and a GPS receiver 24.

The speed sensor 21 detects the speed of the vehicle 1. The speed sensor 21 transmits the detected speed of the vehicle 1 as vehicle information to the electronic control unit 80.

The acceleration sensor 22 detects the acceleration of the vehicle 1 at the time of acceleration and the time of braking. The acceleration sensor 22 transmits the detected acceleration of the vehicle 1 as vehicle information to the electronic control unit 80.

The yaw rate sensor 23 detects the posture of the vehicle 1. Specifically, the yaw rate sensor 23 detects the speed of change of the yaw angle at the time of turning of the vehicle 1, that is, the rotational angle speed (yaw rate) around the vertical axis of the vehicle 1. The yaw rate sensor 23 transmits the detected posture of the vehicle 1 as vehicle information to the electronic control unit 80.

The GPS receiver 24 receives signals from three or more GPS satellites, identifies the latitude and longitude of the vehicle 1, and detects the current position of the vehicle 1. The GPS receiver 24 transmits the detected current position of the vehicle 1 as vehicle information to the electronic control unit 80.

The driver information acquiring device 30 acquires driver information relating to the conditions of the driver of the vehicle 1. The driver information includes the facial expression, posture, etc. of the driver. As shown in FIG. 1, the driver information acquiring device 30 is provided with a driver monitor camera 31 and a steering wheel touch sensor 32.

The driver monitor camera 31 captures an image of the appearance of the driver. As shown in FIG. 3, in the present embodiment, the driver monitor camera 31 is attached to the top surface of a steering wheel column cover. The driver monitor camera 31 performs image processing of the captured image of the driver so as to detect the facial expression of the driver (direction of face of driver, line of sight, degree of opening of eyes, etc.), posture, and other appearance information of the driver. The driver monitor camera 31 transmits the detected appearance information of the driver as driver information to the electronic control unit 80. Note that, the position at which the driver monitor camera 31 is attached to the vehicle 1 may be a position different from the position shown in FIG. 3.

The steering wheel touch sensor 32 detects if the driver is gripping the steering wheel. As shown in FIG. 3, the steering wheel touch sensor 32 is attached to the steering wheel. The steering wheel touch sensor 32 transmits the detected gripping information of the steering wheel as driver information to the electronic control unit 80. Note that, the position at which the steering wheel touch sensor 32 is attached to the vehicle 1 may be a position different from the position shown in FIG. 3.

The map database 40 is a database relating to map information. The map database 40 is, for example, stored in a hard disk drive (HDD) carried in the vehicle 1. The map information includes position information of the road, shape information of the road (for example, differentiation between curves and straight parts, curvature of curves, etc.), position information of intersections and junctions, road types, and other information.

The storage device 50 stores automated driving road maps. The automated driving road maps are prepared by the electronic control unit 80 based on the 3D image generated by the LIDAR 11. The electronic control unit 80 updates the automated driving road maps constantly or periodically.

The HMI 60 is an interface for input and output of information between the driver or vehicle passenger and the automated driving system 100. The HMI 60, for example, includes a display displaying text or image information, a speaker generating sound, operating buttons for the driver or vehicle passenger to input operations, a touch panel, a microphone, etc.

The navigation system 70 guides the vehicle 1 to a destination set by the driver through the HMI 60. The navigation system 70 calculates the target route to the target destination based on the current position information of the vehicle 1 detected by the GPS receiver 24 and the map information of the map database 40. The navigation system 70 transmits the calculated information relating to the target route as navigation information to the electronic control unit 80.

The electronic control unit 80 is a microcomputer provided with components connected with each other by bidirectional buses such as a center processing unit (CPU), read only memory (ROM), random access memory (RAM), input port, and output port. The electronic control unit 80 outputs control signals for controlling various actuators for performing individual driving assistance operations from the output port to control the vehicle 1 based on surrounding environment information, vehicle information, driver information, navigation information, and other various information required for automated driving, which are input to the electronic control unit 80.

<Explanation of Driving Assistance Operations in Automated Driving>

FIG. 4 is a view showing a list of driving assistance operations performed in the automated driving mode by the automated driving system 100 in the present embodiment. In the present embodiment, the driving assistance operations are roughly divided into three groups of functions of running assistance functions, vision assistance functions, and congestion assistance functions.

The driving assistance operations grouped together in the section of running assistance functions are driving assistance operations having functions for performing at least one of acceleration, steering, and braking (running assistance functions). In the present embodiment, as driving assistance operations having running assistance functions, vehicle distance control, lane tracking control, auto stop control, auto lane change, auto passing, auto branching, and auto merging may be mentioned. However, the types and numbers of the driving assistance operations having running assistance functions may differ from those shown in FIG. 4.

Note that, "vehicle distance control" is control automatically adjusting the vehicle speed within the range of a limit speed so as to be able to maintain a suitable vehicle distance corresponding to the vehicle speed while tracking a preceding vehicle in response to the change of vehicle speed of the preceding vehicle. "Lane tracking control" is control automatically adjusting the steering amount or vehicle speed so that the vehicle 1 runs on a suitable running line corresponding to the lane width of the running lane. "Auto stop control" is control for making the vehicle speed gradually fall and making the vehicle 1 stop.

The driving assistance operations grouped together in the section of vision assistance functions are driving assistance operations having functions of securing the field of vision of the driver and in turn safety (vision assistance functions) among driving assistance operations not having running assistance functions (that is, not performing any of acceleration, steering, and braking). In the present embodiment, as driving assistance operations having vision assistance functions, lane departure warning, blind spot monitoring, and other of eleven driving assistance operations may be illustrated. However, the types and numbers of the driving assistance operations having vision assistance functions may differ from those shown in FIG. 4.

The driving assistance operations grouped together in the section of congestion assistance functions are driving assistance operations having functions of easing fatigue of the driver and vehicle passengers at the time of congestion (congestion assistance functions). In the present embodiment, as driving assistance operations having congestion assistance functions, auto start from stopping at the time of congestion and control for turning on the hazard light and other of eight driving assistance operations may be illustrated. However, the types and numbers of the driving assistance operations having congestion assistance functions may differ from those shown in FIG. 4.

In this regard, it is preferable for the driver to be able to freely set permissions for individual driving assistance operations before the start of automated driving and during automated driving so that driving assistance operations not required by the driver are not automatically performed at the time of automated driving. On the other hand, if the driver sets permissions for individual driving assistance operations at automated driving one at a time, the operation by the driver for setting the system would become troublesome and in turn the convenience of automated driving would fall. Further, the conditions of the surrounding environment, conditions of the host vehicle, and conditions of the driver change at each instant while the vehicle is running. Situations arise where some driving assistance operations become difficult (for example, poor weather etc.)

<Explanation of Driving Assistance Package>

Therefore, in the present embodiment, a driving assistance package which packages permissions for a plurality of driving assistance operations is determined based on at least one of the surrounding environment information, host vehicle information, and driver information, and the determined driving assistance package is proposed to the driver. Specifically, unit packages suitable for the weather conditions, sunlight conditions, road types, road conditions, driver conditions, and host vehicle conditions are selected from the groups of packages shown in FIG. 5 to FIG. 10 and a driving assistance package combining the selected unit packages is proposed to the driver.

Below, referring to FIG. 5 to FIG. 10, the groups of packages will be explained. Note that, in FIG. 5 to FIG. 10, the O marks show permission to perform the driving assistance operations, while the X marks show no permission to perform the driving assistance operations. Further, the groups of packages are stored in the ROM of the electronic control unit 80.

FIG. 5 is a view showing the group of packages relating to the conditions of the weather. The group of packages relating to the weather conditions roughly divides weather conditions into the nine conditions of "clear", "rain", "heavy rain", "snow", "heavy snow", "fog", "thick fog", "wind", and "strong wind" and packages permissions for individual driving assistance operations for each of the weather conditions. For this reason, the group of packages relating to the weather conditions includes nine unit packages. In the present embodiment, the weather conditions during automated driving are specified based on the meteorological information around the vehicle 1 detected by the outside camera 13 and the meteorological information included in external information received by the external information receiving apparatus 16.

FIG. 6 is a view showing the group of packages relating to the conditions of sunlight. The group of packages relating to the sunlight conditions roughly divides sunlight conditions into "day" and "night" and packages permissions for individual driving assistance operations for each of the sunlight conditions. For this reason, the group of packages relating to the sunlight conditions includes two unit packages. In the present embodiment, the sunlight conditions during automated driving are specified based on the luminance information detected by the luminance sensor 14 and the time of day.

FIG. 7 is a view showing the group of packages relating to the types of the road. The group of packages relating to the road type roughly divides road types into the four types of "general roads", "trunk roads", "inter-city highways" (Tokyo-Nagoya highway, Nagoya-Kobe highway, etc.), and "city highways" (Tokyo metropolitan highway and Osaka-Kobe highway etc.) and packages permissions for individual driving assistance operations for each of the road types. For this reason, the group of packages relating to the road types includes four unit packages. In the present embodiment, the road type during automated driving is specified based on the traffic information around the vehicle 1 detected by the outside camera 13 and the road type information contained in the map information of the map database 40.

FIG. 8 is a view showing the group of packages relating to the conditions of the road. The group of packages relating to the road conditions roughly divides the road conditions into congested and noncongested and packages permissions for individual driving assistance operations for each of the road conditions. For this reason, the group of packages relating to the road conditions includes two unit packages. In the present embodiment, the road conditions during automated driving are specified based on the information of the 3D image generated by the LIDAR 11, the surrounding environment information detected by the milliwave radar sensors 12, the information on obstacles in front of the vehicle 1 detected by the outside camera 13 and traffic information around the vehicle 1, the congestion information included in the external information received by the external information receiving apparatus 16, and the speed of the vehicle 1 detected by the speed sensor 21.

Note that, in the present embodiment, "congested" means a condition where there is another vehicle around the vehicle 1 (preceding vehicle or following vehicle) and the speeds of the vehicle 1 and the other vehicle around the vehicle 1 are sustained constant speeds (for example, on general roads and trunk roads, 20 km/h and on inter-city highways and city highways, 40 km/h) or less. On the other hand, "noncongested" means a condition other than "congested".

FIG. 9 is a view showing a group of packages relating to the conditions of the driver. The group of packages relating to the driver conditions roughly divides the driver conditions into the six conditions of "sleepy", "tired", "overworked", "distracted", "normal", and "deadman" and packages permissions for individual driving assistance operations for each of the driver conditions. For this reason, the group of packages relating to the driver conditions includes six unit packages. In the present embodiment, the driver conditions during automated driving are specified by the information of the appearance of the driver detected by the driver monitor camera 31 and information of gripping of the steering wheel detected by the steering wheel touch sensor 32. Specifically, the driver conditions are specified by detecting the facial expression of the driver (direction of face, degree of opening/closing of the eyes, etc.) from the information on the appearance of the driver while referring to the information of gripping of the steering wheel and comparing the detected expression of the driver with an expression according to the driver conditions stored in the ROM in advance.

Note that, the parameters for specifying driver conditions are not limited to the information on the appearance of the driver and information of gripping of the steering wheel. For example, it is also possible to detect the heartbeat, pulse, brainwave, etc. of the driver and compare the same with the heartbeat, pulse, brainwave, etc. corresponding to the driver conditions stored in advance in the ROM so as to specify the driver conditions. In this case, the driver information acquiring device is provided with a heartbeat sensor, a pulse sensor, a brainwave sensor, etc.

Note that, in the present embodiment, "sleepy" means a condition where the concentration of the driver in the driving operation has fallen due to sleepiness but not to an extent requiring the driver to immediately stop driving. "Tired" means a condition where the concentration of the driver in the driving operation has fallen due to tiredness but not to an extent requiring the driver to immediately stop driving. "Overworked" means a condition where the concentration of the driver in the driving operation has fallen due to tiredness to an extent requiring the driver to immediately stop driving. "Distracted" means, for example, when the driver is performing a second task other than the driving operation such as operating a mobile phone, tablet PC, or other mobile device or is viewing a moving image, when the driver is looking at the sides, and other conditions where the concentration of the driver in the driving operation has fallen due to factors other than sleepiness and tiredness.

"Deadman" means a condition where the driver cannot perform driving operations relating to acceleration, steering, and braking. For example, when the driver is asleep, when the driver has died, when the driver has lost consciousness, or when the limbs of the driver are paralyzed, it is judged that the driver condition is a "deadman" condition. "Normal" means a condition other than "sleepy", "tired", "overworked", "distracted", and "deadman".

FIG. 10 is a view showing the group of packages relating to the conditions of the host vehicle. The group of packages relating to the host vehicle conditions roughly divides the host vehicle conditions into "unstable" and "stable" and packages permissions for individual driving assistance operations for each vehicle condition. For this reason, the group of packages relating to the host vehicle conditions includes two unit packages. In the present embodiment, the host vehicle conditions are specified based on the acceleration of the vehicle 1 detected by the acceleration sensor 22 and the posture of the vehicle 1 detected by the yaw rate sensor 23.

Note that, in the present embodiment, the "unstable" of the host vehicle conditions means a condition where pitching, rolling, yawing, etc. of the vehicle 1 are continuing and the behavior of the vehicle 1 is disturbed. "Pitching" means the vehicle rocking to the front and back about the horizontal axis in the left-right direction passing through the center of gravity of the vehicle. "Rolling" means the vehicle rocking to the left and right about the horizontal axis in the front-back direction passing through the center of gravity of the vehicle. "Yawing" means the vehicle rocking to the left and right about the vertical axis passing through the center of gravity of the vehicle. On the other hand, "stable" of the host vehicle conditions means a condition other than unstable conditions, that is, a condition where pitching, rolling, yawing, etc. of the vehicle 1 do not occur and the behavior of the vehicle 1 is not disturbed.

<Control by Automated Driving System>

The automated driving system 100 is further provided with an automated driving executing part 90, a package determining part 91, a package proposing part 92, and an emergency condition judging part 93. In the present embodiment, as shown in FIG. 1, the automated driving executing part 90, package determining part 91, package proposing part 92, and emergency condition judging part 93 are a part of the electronic control unit 80.

The automated driving executing part 90 performs automated driving of the vehicle 1 based on the driving assistance package packaging permissions of a plurality of driving assistance operations. Specifically, the driving assistance package has permissions for individual driving assistance operations set in it, so the automated driving executing part 90 performs the permitted driving assistance operations and does not perform the not permitted driving assistance operations.

The package determining part 91 determines the driving assistance package to be proposed to the driver based on at least one of the surrounding environment information acquired by the surrounding environment information acquiring device 10, the vehicle information acquired by the vehicle information acquiring device 20, and driver information acquired by the driver information acquiring device 30. The package proposing part 92 proposes the driving assistance package determined by the package determining part 91 to the driver. Due to this, it is possible to propose to the driver a suitable driving assistance package corresponding to at least one of the surrounding environment conditions, vehicle conditions, and driver conditions. Further, if the surrounding environment conditions etc. change during the automated driving, it is possible to propose a suitable driving assistance package corresponding to the changed conditions to the driver each time.

The emergency condition judging part 93 judges whether the driver is in an emergency condition based on the driver information acquired by the driver information acquiring device 30. The automated driving executing part 90 performs automated driving of the vehicle 1 based on the emergency driving assistance package packaging permissions for the plurality of driving assistance operations when the driver is in an emergency condition, if it is judged by the emergency condition judging part 93 that the driver is in an emergency condition. For this reason, in the present embodiment, at the time of an emergency, the driving assistance operations permitted in the emergency driving assistance package are automatically executed. As a result, it is possible to ensure safety at the time of an emergency.

The emergency driving assistance package is, for example, the unit package relating to the "deadman" condition shown in FIG. 9. In the emergency driving assistance package, as driving operations relating to the running assistance functions, lane tracking control and auto stop control are permitted. Further, in the emergency driving assistance package, control for turning on the hazard light is permitted as a driving operation relating to congestion assistance functions. For this reason, the automated driving executing part 90 makes the hazard light of the vehicle 1 turn on while making the vehicle speed gradually fall and making the vehicle 1 stop when it is judged by the emergency condition judging part 93 that the driver is in an emergency condition.

Note that, in the emergency driving assistance package, auto lane change may also be permitted in addition to lane tracking change and auto stop control. In this case, the automated driving executing part 90 makes the hazard light of the vehicle 1 turn on while making the vehicle speed gradually fall and making the vehicle 1 stop at the road shoulder, if it is judged that the driver is in an emergency condition when, for example, the vehicle 1 is running on a road where the vehicle 1 can be made to safely stop at the road shoulder such as on a highway.

Further, in the emergency driving assistance package in the present embodiment, as shown in FIG. 9, all driving assistance operations relating to vision assistance operations are permitted. However, in the emergency driving assistance package, a part or all of the driving assistance operations relating to the vision assistance operations may not be permitted.

On the other hand, the automated driving executing part 90 performs automated driving of the vehicle 1 based on the driving assistance package proposed by the package proposing part 92 and approved by the driver if it is judged by the emergency condition judging part 93 that the driver is not in an emergency condition. The driving assistance package proposed by the package proposing part 92 is set with permissions for individual driving assistance operations corresponding to the surrounding environment conditions etc. For this reason, the driver can set permissions for individual driving assistance operations at one time by just approving the driving assistance package proposed by the package proposing part 92. Therefore, the driver can easily set permissions for individual driving assistance operations in automated driving in accordance with the surrounding environment conditions etc.

Therefore, the automated driving system 100 enables the driver to easily set permissions for individual driving assistance operations in automated driving in accordance with the surrounding environment conditions etc. while securing safety at the time of an emergency by performing the above-mentioned control.

<Explanation of Control Using Flow Chart>

Figure 11:
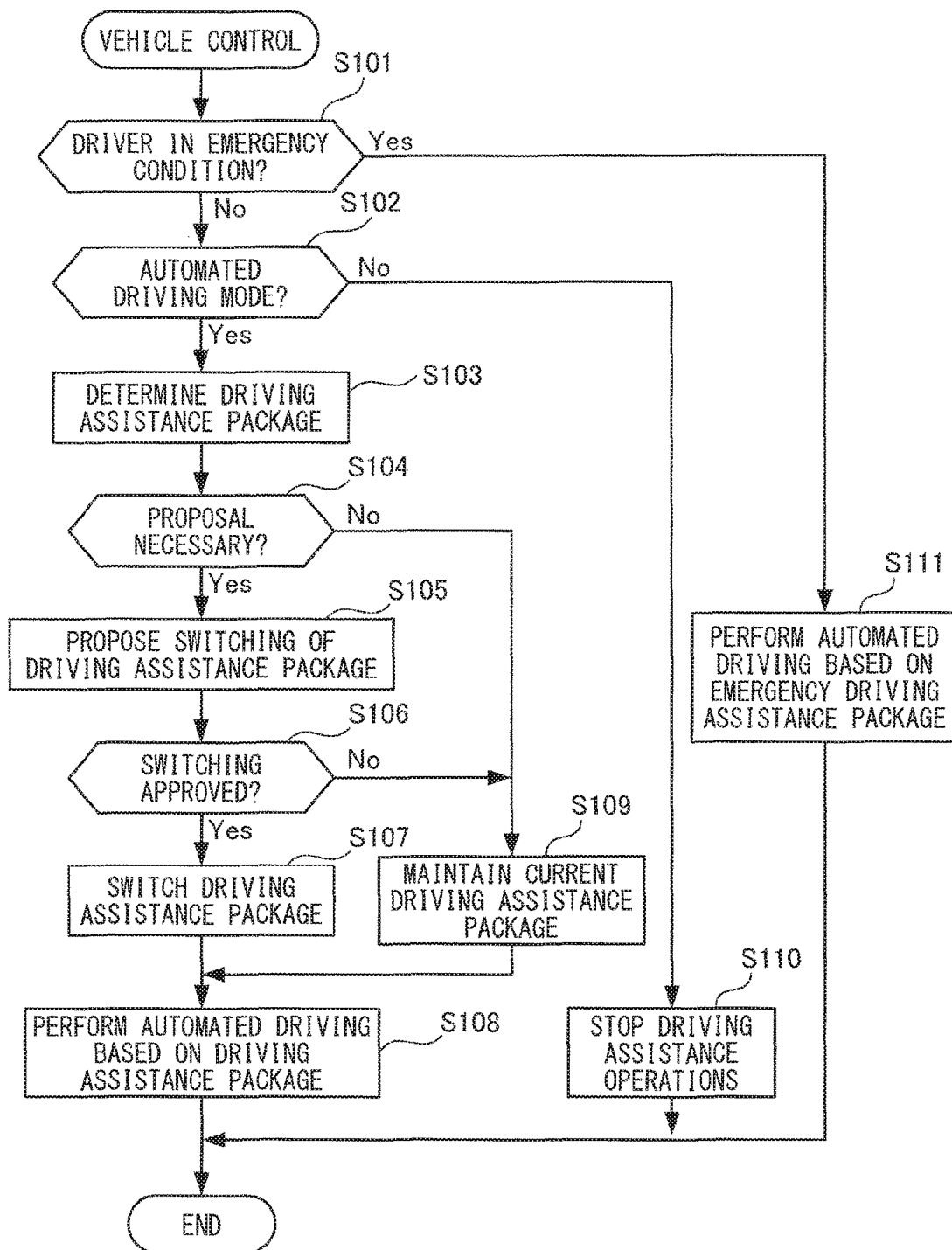
FIG. 11 is a flow chart showing a control routine of vehicle control in the first embodiment of the present invention.

Below, referring to the flow chart of FIG. 11, vehicle control by the automated driving system 100 will be explained in detail. FIG. 11 is a flow chart showing a control routine for vehicle control in the first embodiment of the present invention. The present control routine is repeatedly executed by the electronic control unit 80.

First, at step S101, the emergency condition judging part 93 judges whether the driver is in an emergency condition based on the driver information. The driver information is acquired by the driver information acquiring device 30. In the present embodiment, if it is judged that the driver condition is a "deadman" condition based on the driver information, it is judged that the driver is in an emergency condition.

For example, the emergency condition judging part 93 judges that the driver is in an emergency condition if the eyes of the driver remain closed for a predetermined time or more. The degree of opening/closing of the eyes of the driver is detected by the driver monitor camera 31. Further, if the driver information acquiring device 30 is provided with a heartbeat sensor or pulse sensor, the emergency condition judging part 93 may judge that the driver is in an emergency condition when the heartbeat or pulse of the driver detected by the sensor is a value outside of the normal range stored in the ROM. Further, when the driver information acquiring device 30 is provided with a microphone, the emergency condition judging part 93 may judge that the driver is in an emergency condition when the driver or another passenger inputs the fact of the driver being in an emergency condition through the microphone. Further, when the operating mode of the vehicle 1 is the manual mode, the emergency condition judging part 93 may judge that the driver is in an emergency condition when the driver has not been gripping the steering wheel for a predetermined time or more. The gripping information of the steering wheel is detected by the steering wheel touch sensor 32. Note that, the "manual operating mode" is the operating mode where all driving operations relating to acceleration, steering, and braking are performed by the driver.

If at step S101 it is judged that the driver is not in an emergency condition, the present control routine proceeds to step S102. At step S102, the automated driving executing part 90 judges whether the operating mode of the vehicle 1 is the automated driving mode. The automated driving mode and the manual driving mode are switched by the driver. Note that, the "automated driving mode" is the operating mode where at least one of the driving operations relating to acceleration, steering, and braking is performed by the automated driving system 100.

If at step S102 it is judged that the driving mode of the vehicle 1 is the automated driving mode, the present control routine proceeds to step S103. At step S103, the package determining part 91 determines the driving assistance package to be proposed to the driver based on the surrounding environment information, host vehicle information, and driver information. The surrounding environment information is acquired by the surrounding environment information acquiring device 10. The vehicle information is acquired by the vehicle information acquiring device 20. The driver information is acquired by the driver information acquiring device 30.

Specifically, the package determining part 91 first specifies the conditions of the surrounding environment (in the present embodiment, conditions of the weather, conditions of sunlight, type of road, and conditions of the road), conditions of the host vehicle, and conditions of the driver based on the surrounding environment information, vehicle information, and driver information. Next, the package determining part 91 selects the unit package of the weather condition specified as the current weather condition from the group of packages relating to the weather conditions. For example, the package determining part 91 selects the unit package of "heavy rain" from the group of packages relating to the weather conditions when specifying that the current weather condition are "heavy rain". Similarly, the package determining part 91 selects the unit package of the sunlight condition specified as the current sunlight condition from the group of packages relating to the sunlight conditions, selects the unit package of the road type specified as the road type currently being run on from the group of packages relating to the road types, selects the unit package of the road condition specified as the current road condition from the group of packages relating to the road conditions, selects the unit package of the driver condition specified as the current driver condition from the group of packages relating to the driver conditions, and selects the unit package of the host vehicle condition specified as the current host vehicle condition from the group of package relating to the host vehicle conditions.

After selection of the unit packages, the package determining part 91 determines the driving assistance package by combining the selected unit packages. At this time, in the present embodiment, the running assistance functions are combined by AND conditions and the vision assistance functions and congestion assistance functions are combined by OR conditions. Therefore, regarding driving assistance operations relating to the running assistance functions, driving assistance operations permitted in all unit packages are permitted in the driving assistance package. On the other hand, driving assistance operations which are not performed in one or more unit packages are not permitted in the driving assistance package.

Further, regarding driving assistance operations relating to the vision assistance functions and congestion assistance functions, driving assistance operations permitted in one or more unit packages are permitted in the driving assistance package. Further, driving assistance operations permitted in all unit packages are also permitted in the driving assistance package. On the other hand, driving assistance operations which are not permitted in all unit packages are not permitted in the driving assistance package.

In this way, in the present embodiment, the running assistance functions are combined by AND conditions while the vision assistance functions and congestion assistance functions are combined by OR conditions, but the methods of combinations are not limited. Combination by AND conditions or OR conditions in accordance with need is also possible. Further, all functions may be combined by AND conditions or OR conditions.

Next, at step S104, the package proposing part 92 judges whether the driving assistance package determined at step S103 needs to be proposed to the driver. Specifically, the package proposing part 92 judges whether the driving assistance package determined at step S103 differs from the currently selected driving assistance package. The package proposing part 92 judges that it is necessary to propose the driving assistance package to the driver when the driving assistance package determined at step S103 differs from the currently selected driving assistance package. On the other hand, the package proposing part 92 judges that it is not necessary to propose the driving assistance package to the driver when the driving assistance package determined at step S103 is the same as the currently selected driving assistance package.

If at step S104 it is judged that a driving assistance package needs to be proposed to the driver, the present control routine proceeds to step S105. At step S105, the package proposing part 92 proposes switching of the driving assistance package. Specifically, the package proposing part 92 proposes to switch the currently selected driving assistance package to the driving assistance package determined at step S103.

Next, at step S106, the automated driving executing part 90 judges whether the switching of the driving assistance package was approved by the driver. If it is judged that the switching of the driving assistance package was approved by the driver, the present control routine proceeds to step S107. At step S107, the automated driving executing part 90 switches the driving assistance package to the driving assistance package proposed by the package proposing part 92 and approved by the driver. That is, the automated driving executing part 90 selects the driving assistance package proposed by the package proposing part 92 and approved by the driver as the new driving assistance package.

Next, at step S108, the automated driving executing part 90 performs automated driving of the vehicle 1 based on the driving assistance package selected at step S107. Specifically, the automated driving executing part 90 controls the various actuators of the vehicle 1 so as to perform the driving assistance operations permitted in the driving assistance package selected at step S107. After step S108, the present control routine ends.

On the other hand, if at step S106 it is judged that the switching of the driving assistance package was not approved by the driver, the present control routine proceeds to step S109. At step S109, the automated driving executing part 90 maintains the currently selected driving assistance package. Next, at step S108, the automated driving executing part 90 performs automated driving of the vehicle 1 based on the driving assistance package maintained at step S109.

Further, if at step S102 it is judged that the operating mode is the manual mode, the present control routine proceeds to step S110. At step S110, all driving assistance operations are stopped. After step S110, the present control routine ends.

Further, if at step S101 it is judged that the driver is in an emergency condition, the present control routine proceeds to step S111. At step S111, the automated driving executing part 90 performs automated driving of the vehicle 1 based on the emergency driving assistance package packaging permissions of the plurality of driving assistance operations when the driver is in an emergency condition. Specifically, the automated driving executing part 90 controls the various actuators of the vehicle 1 so as to perform the driving assistance operations permitted in the emergency driving assistance package. The emergency driving assistance package is, for example, the unit package relating to the "deadman" condition shown in FIG. 9. After step S111, the present control routine is ended.

Note that, the order of step S101 and step S102 may be reversed. In this case, when the operating mode selected by the driver is the manual driving mode, automated driving based on the emergency driving assistance package is not performed. Further, at step S103, the package determining part 91 may determine the driving assistance package to be proposed to the driver based on at least one of the surrounding environment information, host vehicle information, and driver information.

Second Embodiment

The configuration and control of the automated driving system according to the second embodiment are basically similar to the configuration and control of the automated driving system according to the first embodiment except for the points explained below. For this reason, below, the second embodiment of the present invention will be explained focusing on the parts different from the first embodiment.

Figure 12:
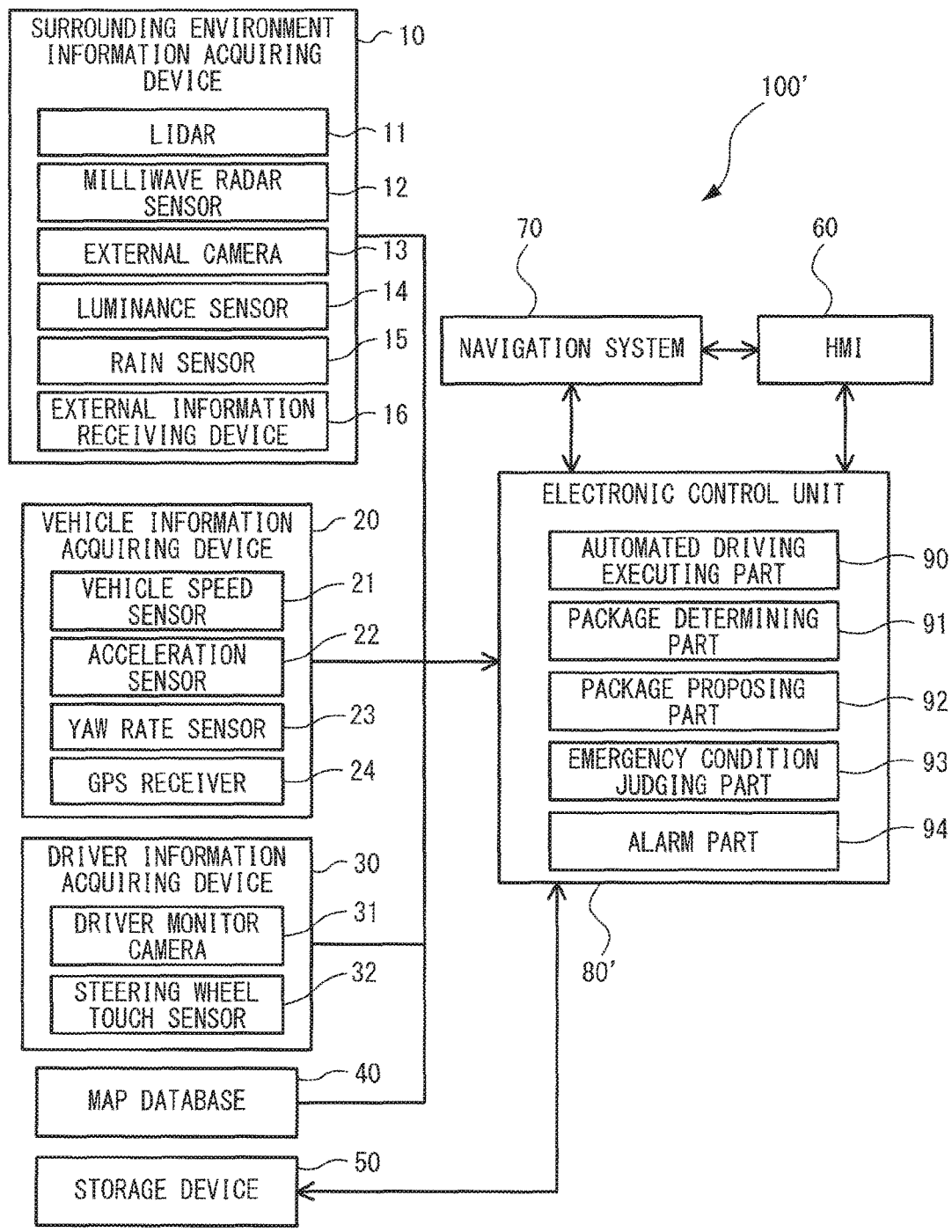
FIG. 12 is a block diagram showing the configuration of a vehicle automated driving system according to a second embodiment of the present invention.

FIG. 12 is a block diagram showing the configuration of an automated driving system 100' of a vehicle according to the second embodiment of the present invention. The automated driving system 100' further comprises an alarm part 94 issuing a warning to the driver. In the present embodiment, the alarm part 94 is a part of the electronic control unit 80'.

The automated driving executing part 90 performs automated driving of the vehicle 1 based on the emergency driving assistance package if it is judged by the emergency condition judging part 93 that the driver is in an emergency condition after warning by the alarm part 94. Due to this, if the driver has fallen asleep, the warning can be used to return the driver to normal condition, and frequent automated driving based on the emergency driving assistance package can be suppressed.

The alarm part 94, for example, issues a warning to the driver by sound through a speaker of the HMI 60 etc. Further, the alarm part 94 may control the various actuators of the vehicle 1 to change the behavior of the vehicle 1 to issue a warning to the driver. In this case, the alarm part 94, for example, makes the vehicle 1 rapidly accelerate, rapidly decelerate, rapidly start, or rapidly stop in a range in which safety can be secured to issue a warning to the driver. Further, the alarm part 94 may make the position of the driver's seat of the vehicle 1 change or make the degree of tightening of the seatbelt of the vehicle 1 change so as to issue a warning to the driver.

Figure 13:
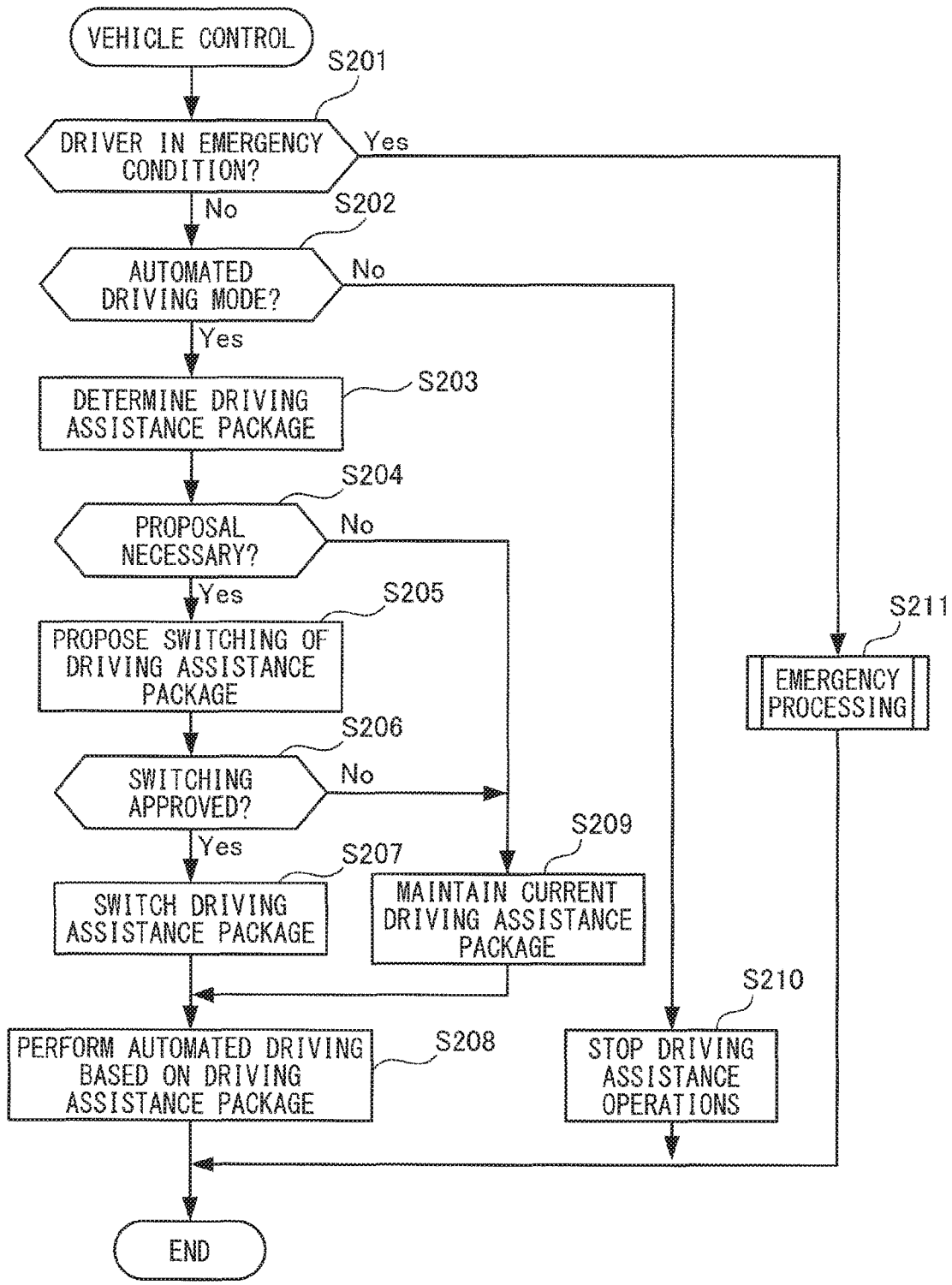
FIG. 13 is a flow chart showing a control routine of vehicle control in the second embodiment of the present invention.

Below, referring to the flow chart of FIG. 13, the vehicle control in the second embodiment will be explained in detail. FIG. 13 is a flow chart showing a control routine of vehicle control in the second embodiment of the present invention. The present control routine is repeatedly performed by the electronic control unit 80'. Step S201 to step S210 in FIG. 13 are similar to step S101 to step S110 in FIG. 11, so explanations will be omitted.

Figure 14:
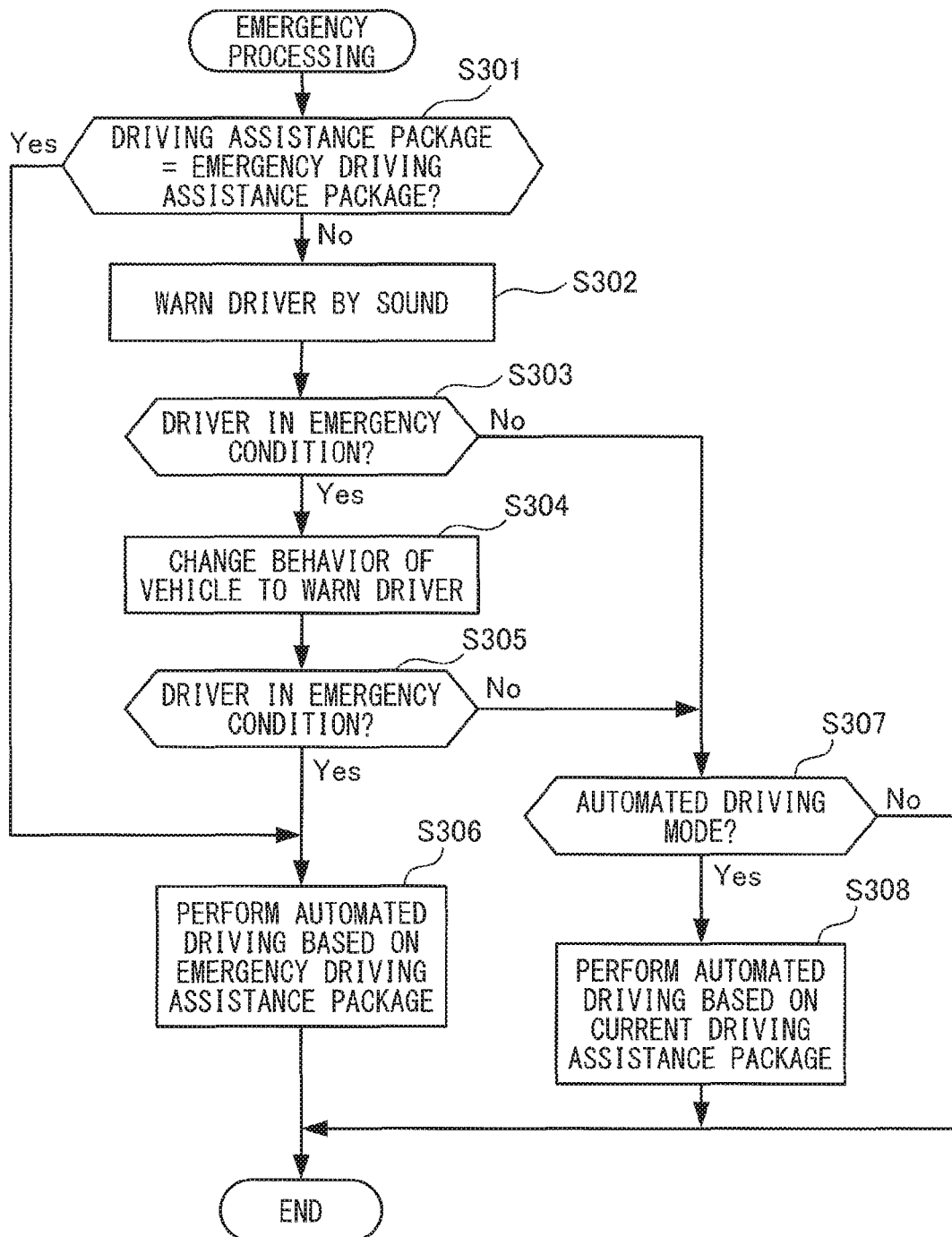
FIG. 14 is a flow chart showing a control routine of emergency processing.

In the present control routine, if at step S201 it is judged that the driver is in an emergency condition, the present control routine proceeds to step S211. At step S211, a control routine for emergency processing shown in FIG. 14 is performed. FIG. 14 is a flow chart showing a control routine of emergency processing.

First, at step S301, the automated driving executing part 90 judges whether the currently selected driving assistance package is an emergency driving assistance package. If it is judged that the currently selected driving assistance package is not an emergency driving assistance package, the present control routine proceeds to step S302. At step S302, the alarm part 94 issues a warning to the driver by sound. Specifically, the alarm part 94 generates a loud sound through the speaker of the HMI 60 etc. for a predetermined time period.

Next, at step S303, the emergency condition judging part 93 judges whether the driver is in an emergency condition based on the driver information. If it is judged that the driver is in an emergency condition even after the warning at step S302, the present control routine proceeds to step S304.

At step S304, the alarm part 94 controls the various actuators of the vehicle 1 to change the behavior of the vehicle 1 and thereby issue a warning to the driver. Specifically, the alarm part 94 makes the vehicle 1 rapidly accelerate, rapidly decelerate, rapidly start, or rapidly stop within a range where safety can be secured. Note that, the alarm part 94 may change the position of the driver's seat in the vehicle 1 or change the degree of tightness of the seatbelt of the vehicle 1.

Next, at step S305, the emergency condition judging part 93 judges whether the driver is in an emergency condition based on the driver information. If it is judged that the driver is in an emergency condition even after the warning at step S302 and step S304, the present control routine proceeds to step S306.

At step S306, the automated driving executing part 90 performs automated driving of the vehicle 1 based on the emergency driving assistance package packaging permissions of the plurality of driving assistance operations when the driver is in an emergency condition. Specifically, the automated driving executing part 90 controls the various actuators of the vehicle 1 so as to perform driving assistance operations permitted in the emergency driving assistance package. The emergency driving assistance package is, for example, the unit package relating to the "deadman" condition shown in FIG. 9. After step S306, the present control routine is ended.

On the other hand, if at step S301 it is judged that the driving assistance package is the emergency driving assistance package, the present control routine proceeds to step S306. In this case, automated driving based on the emergency driving assistance package is continued.

Further, if at step S303 or step S305 it is judged that the driver is not in an emergency condition, the present control routine proceeds to step S307. In this case, the driver has returned to the normal condition by the warning. At step S307, the automated driving executing part 90 judges whether the operating mode is the automated driving mode. If it is judged that the operating mode is the automated driving mode, the present control routine proceeds to step S308.

At step S308, the automated driving executing part 90 performs automated driving of the vehicle 1 based on the currently selected driving assistance package. After step S308, the present control routine ends. On the other hand, if at step S307 it is judged that the operating mode is the manual operating mode, the present control routine ends. In this case, manual operation by the driver is continued.

Note that, in the present control routine, the warning is issued to the driver two times, but the number of times the warning is issued may be a single time. In this case, step S302 and step S303 or step S304 and step S305 are omitted. Further, the order of steps S302 and step S304 may be reversed. Further, in the present control routine, when the emergency driving assistance package is selected as the driving assistance package, no warning is given to the driver, but at this time as well, a warning may be given to the driver.

Third Embodiment

The configuration and control of the automated driving system according to the third embodiment are basically similar to the configuration and control of the automated driving system according to the first embodiment except for the points explained below. For this reason, below, the third embodiment of the present invention will be explained focusing on the parts different from the first embodiment.

In the third embodiment, the emergency condition judging part 93 judges that the driver is in an emergency condition when the driving assistance package determined by the package determining part 91 is the emergency driving assistance package. The emergency driving assistance package is, for example, the unit package relating to the "deadman" condition shown in FIG. 9.

Figure 15:
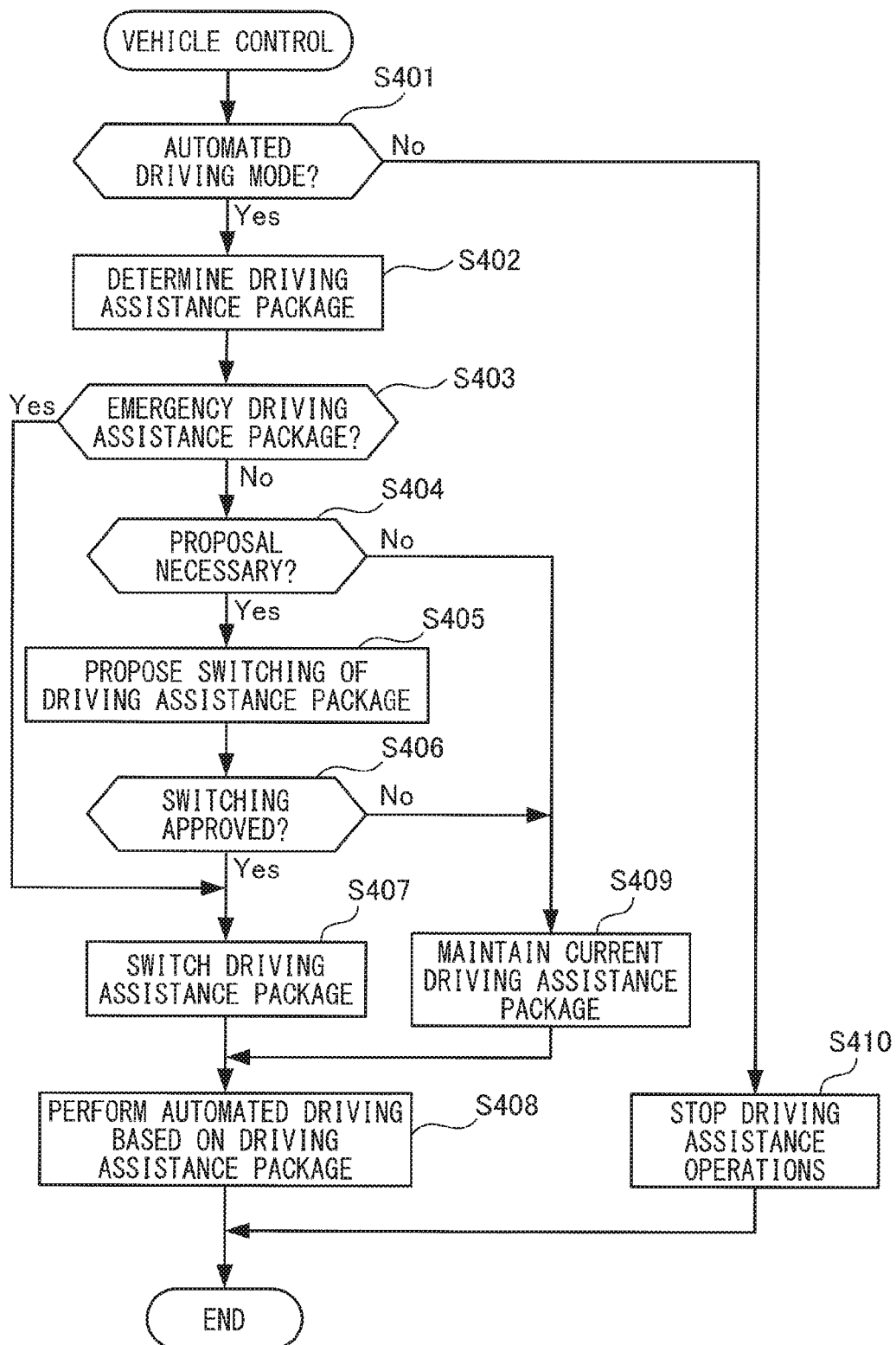
FIG. 15 is a flow chart showing a control routine of vehicle control in a third embodiment of the present invention.

Below, referring to the flow chart of FIG. 15, vehicle control in the third embodiment will be explained. FIG. 15 is a flow chart showing a control routine of vehicle control in the third embodiment of the present invention. The present control routine is performed by electronic control unit 80 repeatedly. Steps S401, S402, and S404 to S410 in FIG. 15 respectively correspond to steps S102, S103, and S104 to S110 in FIG. 11. In the control routine shown in FIG. 15, steps S101 and S111 in FIG. 11 are deleted and step S403 is added between step S103 and step S104 in FIG. 11.

In the present control routine, at step S402, in the same way as step S103 of FIG. 11, the package determining part 91 determines the driving assistance package to be proposed to the driver based on the surrounding environment information, host vehicle information, and driver information. Note that, when the package determining part 91 identifies the driver condition to be a "deadman" condition, it selects as the driving assistance package to be proposed to the driver the emergency driving assistance package packaging permissions for the plurality of driving assistance operations for when the driver is in an emergency condition. The emergency driving assistance package is, for example, the unit package relating to the "deadman" condition shown in FIG. 9.

Next, at step S403, the emergency condition judging part 93 judges whether the driving assistance package determined at step S402 is the emergency driving assistance package in order to judge whether the driver is in an emergency condition. At step S403, if it is judged that the driving assistance package determined at step S402 is the emergency driving assistance package, that is, if it is judged that the driver is in an emergency condition, the present control routine proceeds to step S407.

At step S407, the automated driving executing part 90 switches the driving assistance package to the emergency driving assistance package. Next, at step S408, the automated driving executing part 90 performs automated driving of the vehicle 1 based on the emergency driving assistance package. Specifically, the automated driving executing part 90 controls various actuators of the vehicle 1 so as to perform driving assistance operations permitted in the emergency driving assistance package. After step S408, the present control routine is ended.

On the other hand, if at step S403 it is judged that the driving assistance package determined at step S402 is not the emergency driving assistance package, the present control routine proceeds to step S404. The later steps S404 to S409 are similar to steps S104 to S109 in FIG. 11. Further, step S410 in the present control routine is similar to step S111 in FIG. 11.

Above, preferred embodiments according to the present invention were explained, but the present invention is not limited to these embodiments and can be corrected and changed in various ways within the scope of the claims. For example, in the above-mentioned embodiments, the driving assistance package is determined by combining unit packages selected based on the surrounding environment information etc., but the driving assistance package may be determined from combinations of unit packages determined in advance based on the surrounding environment information etc.

Further, the above-mentioned embodiments can be carried out in any combinations. For example, at step S403 of FIG. 15, if it is judged that the driving assistance package determined at step S402 is the emergency driving assistance package, instead of step S407 and step S408, the control routine for emergency processing shown in FIG. 14 may be performed. In this case, step S307 of FIG. 14 is omitted.

REFERENCE SIGNS LIST 1. vehicle
10. surrounding environment information acquiring device
20. vehicle information acquiring device
30. driver information acquiring device
80. electronic control unit
90. automated driving executing part
91. package determining part
92. package proposing part
93. emergency condition judging part
94. alarm part
100. automated driving system

The invention claimed is:

1. An automated driving system of a vehicle comprising:
a surrounding environment information acquiring device acquiring surrounding environment information relating to surrounding environment conditions of the vehicle;
a vehicle information acquiring device acquiring vehicle information relating to conditions of the vehicle;
a driver information acquiring device acquiring driver information relating to conditions of a driver of the vehicle;
an automated driving executing part executing automated driving of the vehicle based on a driving assistance package packaging permissions for a plurality of driving assistance operations;
a package determining part determining a driving assistance package to be proposed to the driver based on at least one of the surrounding environment information, the vehicle information, and the driver information,
a package proposing part proposing the driving assistance package determined by the package determining part to the driver; and
an emergency condition judging part judging if the driver is in an emergency condition based on the driver information, wherein
the automated driving executing part performs automated driving of the vehicle based on an emergency driving assistance package packaging permissions of the plurality of driving assistance operations when the driver is in an emergency condition, if the emergency condition judging part judges that the driver is in an emergency condition, and performs automated driving of the vehicle based on the driving assistance package proposed by the packaging proposing part and approved by the driver, if the emergency condition judging part judges that the driver is not in an emergency condition.

2. The vehicle automated driving system according to claim 1, wherein
the package determining part determines a driving assistance package to be proposed to the driver based on the driver information, and
the emergency condition judging part judges that the driver is in an emergency condition when the driving assistance package determined by the package determining part is the emergency driving assistance package.

3. The vehicle automated driving system according to claim 1, wherein
the system further comprises an alarm part issuing a warning to the driver, and the automated driving executing part performs automated driving of the vehicle based on the emergency driving assistance package if the emergency condition judging part judges that the driver is in an emergency condition after the warning by the alarm part.

4. The vehicle automated driving system according to claim 2, wherein the system further comprises an alarm part issuing a warning to the driver, and the automated driving executing part performs automated driving of the vehicle based on the emergency driving assistance package if the emergency condition judging part judges that the driver is in an emergency condition after the warning by the alarm part.

5. The vehicle automated driving system according to claim 3, wherein the alarm part issues the warning to the driver by sound.

6. The vehicle automated driving system according to claim 4, wherein the alarm part issues the warning to the driver by sound.

7. The vehicle automated driving system according to claim 3, wherein the alarm part issues the warning to the driver by changing the behavior of the vehicle.

8. The vehicle automated driving system according to claim 4, wherein the alarm part issues the warning to the driver by changing the behavior of the vehicle.

9. The vehicle automated driving system according to claim 5, wherein the alarm part issues the warning to the driver by changing the behavior of the vehicle.

10. The vehicle automated driving system according to claim 6, wherein the alarm part issues the warning to the driver by changing the behavior of the vehicle.

11. The vehicle automated driving system according to claim 1, wherein in the emergency driving assistance package, an auto stop control of the vehicle and a hazard light turn on control of the vehicle are permitted.

12. The vehicle automated driving system according to claim 2, wherein in the emergency driving assistance package, an auto stop control of the vehicle and a hazard light turn on control of the vehicle are permitted.

13. The vehicle automated driving system according to claim 3, wherein in the emergency driving assistance package, an auto stop control of the vehicle and a hazard light turn on control of the vehicle are permitted.

14. The vehicle automated driving system according to claim 4, wherein in the emergency driving assistance package, an auto stop control of the vehicle and a hazard light turn on control of the vehicle are permitted.

15. The vehicle automated driving system according to claim 5, wherein in the emergency driving assistance package, an auto stop control of the vehicle and a hazard light turn on control of the vehicle are permitted.

16. The vehicle automated driving system according to claim 6, wherein in the emergency driving assistance package, an auto stop control of the vehicle and a hazard light turn on control of the vehicle are permitted.

17. The vehicle automated driving system according to claim 7, wherein in the emergency driving assistance package, an auto stop control of the vehicle and a hazard light turn on control of the vehicle are permitted.

18. The vehicle automated driving system according to claim 8, wherein in the emergency driving assistance package, an auto stop control of the vehicle and a hazard light turn on control of the vehicle are permitted.

19. The vehicle automated driving system according to claim 9, wherein in the emergency driving assistance package, an auto stop control of the vehicle and a hazard light turn on control of the vehicle are permitted.

20. The vehicle automated driving system according to claim 10, wherein in the emergency driving assistance package, an auto stop control of the vehicle and a hazard light turn on control of the vehicle are permitted.

* * * * *